(12) United States Patent
Steele

(10) Patent No.: US 6,650,702 B1
(45) Date of Patent: Nov. 18, 2003

(54) BLIND INITIALIZATION OF DECISION FEEDBACK EQUALIZER USING AN ANTENNA ARRAY

(75) Inventor: Greg Steele, Fremont, CA (US)

(73) Assignee: Lockheed Martin Corp., Bethesda, MD (US)

( * ) Notice: Subject to any disclaimer, the term of this patent is extended or adjusted under 35 U.S.C. 154(b) by 0 days.

(21) Appl. No.: 09/570,704

(22) Filed: May 15, 2000

(51) Int. Cl.[7] .............................. H03H 7/30; H04B 7/10
(52) U.S. Cl. ........................ 375/233; 375/347; 455/137
(58) Field of Search ................................. 375/229, 230, 375/232, 233, 235, 350, 267, 347, 351; 455/132–140; 333/18, 28 R

(56) References Cited

U.S. PATENT DOCUMENTS

| | | | | |
|---|---|---|---|---|
| 5,727,032 A | * | 3/1998 | Jamal et al. ................ | 375/347 |
| 5,844,951 A | * | 12/1998 | Proakis et al. .............. | 375/347 |
| 5,901,174 A | * | 5/1999 | Richard ....................... | 375/229 |
| 6,115,419 A | * | 9/2000 | Meehan ....................... | 375/233 |
| 6,400,761 B1 | * | 6/2002 | Smee et al. ................. | 375/232 |

* cited by examiner

*Primary Examiner*—Tesfaldet Bocure
(74) *Attorney, Agent, or Firm*—Kenneth W. Nelson

(57) ABSTRACT

A decision feedback equalizer and method that implements blind initialization using an antenna array. The equalizer comprises the antenna array which includes two or more antenna elements that form input paths. Two or more feedforward finite impulse response (FIR) filters are respectively coupled to the two or more antenna elements. An attenuator and a switch are coupled in parallel to outputs of all but one feedforward FIR filter. An adder combines the signals output by the feedforward FIR filters. A decision device is coupled to the output of the adder. A decision feedback FIR filter is coupled to the output of the decision device whose output is fed back to the adder and combined with other signals summed thereby. A switch is coupled between the decision device and the decision feedback FIR filter. The equalizer is initialized using a blind adaptation algorithm. The equalizer transitions to normal operation by allowing the feedback and feedforward FIR filters to adapt as inputs from all but one antenna element is attenuated to zero. The equalizer normally operates by using inputs from only one antenna element which is processed by the decision device, the decision feedback FIR filter, and the adder.

6 Claims, 4 Drawing Sheets

BLIND INITIALIZATION OF DECISION FEEDBACK EQUALIZER USING AN ANTENNA ARRAY

BACKGROUND

The present invention relates generally to equalizers, and more particularly, to a decision feedback equalizer and method that provides for blind initialization of the decision feedback equalizer using an antenna array.

The closest prior art known to the inventor relating to the present invention is an article entitled "Adaptive Decision Feedback Equalization: Can You Skip the Training Period?" by Labat et al., IEEE Transactions on Communications, Volume 46, No. 7, July 1998, pages 921–930. As is stated in this article, decision feedback equalizers (DFE's) are often used to combat distortion of communication channels. Even with severe and noisy channels, DFE's can have good steady-state performance, a small output mean-square error (MSE), at a very much lower computational cost than other techniques, such as maximum-likelihood sequence estimation. Since the channels are unknown, the DFE must be implemented in an adaptive way.

In a classical DFE, adaptation cannot be started without the transmission of a known training data sequence d(k), referred to as the training period. Then the proper transmission begins and the tracking of channel distortion is pursued by unsupervised adaptation using the detected data d(k) in place of the true data d(k), which is the decision-directed mode.

The channel can drastically change during the tracking period. Consequently, a continued adaptation requires the periodic transmission of the training sequence, which decreases the effective bit rate and is not always possible. That is why unsupervised DFE's, without any training sequence, are necessary. Adaptation starts as soon as the (unknown) data d(k) are transmitted.

Heretofore, unsupervised adaptive algorithms have been designed for transversal equalizers based on the assumption that the sequence d(k) is zero-mean independent identically distributed. Unfortunately, with a recursive equalizer such as a DFE, the phenomenon of error propagation restricts the use of unsupervised adaptation to the case of an initial "open eye," corresponding to a mild channel. On the other hand, severe channels cannot be properly corrected with a transversal equalizer, especially when there is additive noise, and hence there is a dilemma.

The Labat et al. article discloses an unsupervised (blind) adaptive decision feedback equalizer (DFE that attempts to overcome the problems associated with prior approaches. The Labat et al. DFE is a cascade of four devices, whose main components are a purely recursive filter (R) and a transversal filter (T). The major feature of the Labat et al. DFE is its ability to deal with severe, quickly time-varying channels, unlike prior adaptive DFEs. The equalizer modifies, in a reversible way, both its structure and its adaptation according to a performance measure such as the mean-square error (MSE).

In the starting mode, R comes first and whitens its own output by means of a prediction principle, while T removes the remaining intersymbol interference (ISI) using a Godard (or Shalvi-Weinstein) algorithm. In tracking mode, the equalizer becomes a classical DFE controlled by a decision-directed least-mean-square algorithm. With the same computational complexity, the unsupervised equalizer exhibits the same convergence speed, steady-state MSE, and bit-error rate (BER) as the trained conventional DFE, but it requires no training. The disclose DFE has been implemented on a digital signal processor (DSP) and tested on underwater communications signals-its performances are really convincing.

However, the Labat et al. article discloses or suggests nothing regarding the use of inputs derived from an antenna array to blindly initialize a decision feedback equalizer. It is therefore an objective of the present invention to provide for an improved decision feedback equalizer and nethod that provides for blind initialization of the decision feedback equalizer using an antenna array.

SUMMARY OF THE INVENTION

To accomplish the above and other objectives, the present invention provides for blind initialization of a decision feedback equalizer (DFE) using an antenna array. Various apparatus and methods are disclosed that provide for blind initialization of the decision feedback equalizer.

The decision feedback equalizer comprises an antenna array including two or more antenna elements or sensors that comprise input paths. Outputs of the two or more antenna elements or sensors are coupled to respective finite impulse response (FIR) filters. Outputs of the FIR filters are coupled to an adder that combines the respective signals. The output of the adder is coupled to a decision device. The output of the decision device is coupled to a feedback FIR filter whose output is fed back to the adder and combined with signals derived from the antenna elements and FIR filters. A switch is disposed in the decision feedback path between the decision device and the feedback FIR filter. A switch and an attenuator are disposed in parallel in all but one of the input paths to the adder.

The initialization scheme for the decision feedback equalizer has three modes of operation. In initialization mode, the antenna array is blindly adapted using any of a variety of blind array algorithms (e.g., a constant modulus algorithm (CMA), or prediction error method, for exmaple). In transition mode, feedback and feed-forward structures of the decision feedback equalizer are allowed to adapt in a decision-directed mode as inputs from all but one element of the antenna array are slowly attenuated to zero. In decision feedback equalizer mode, the decision feedback equalizer operates independently of the other array elements, using a single antenna element, the decision device, decision feedback FIR filter, and adder. The other array elements may be used for other tasks.

The present invention thus provides for a means to initialize the decision directed adaptation of the decision feedback equalizer in a strong multipath environment. The present invention provides for blind reception of digitally modulated communication signals in the strong multipath environment.

An exemplary method in accordance with the present invention that blindly initializes a decision feedback equalizer is as follows. A decision feedback equalizer is provided that comprises a plurality of antenna elements, or sensors that provide input paths a plurality of feedforward finite impulse response (FIR) filters, a decision feedback FIR filter, an adder for combining signals output by the feedforward and decision feedback FIR filters, and a decision device disposed between the adder and the decision feedback FIR filter.

In implementing the present method, digitally modulated communication signals are transmitted in a strong multipath environment. The digitally modulated communication signals are received by each of the plurality of antenna elements, or sensors, of the decision feedback equalizer. The digitally modulated communication signals received by each of the antenna elements, or sensors, are processed as follows.

The decision feedback equalizer is initialized using a blind adaptation algorithm while the feedback FIR filter is not used. The decision feedback equalizer transitions to normal operation wherein the feedforward FIR filters and the decision feedback FIR filter are allowed to adapt while inputs from all but one element of the antenna array are slowly attenuated to zero, using variable attenuators in the input paths. The decision feedback equalizer then operates in the normal mode, wherein the decision feedback FIR filter operates independently of the other FIR filters receiving input from only one antenna element and feed forward FIR filter.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
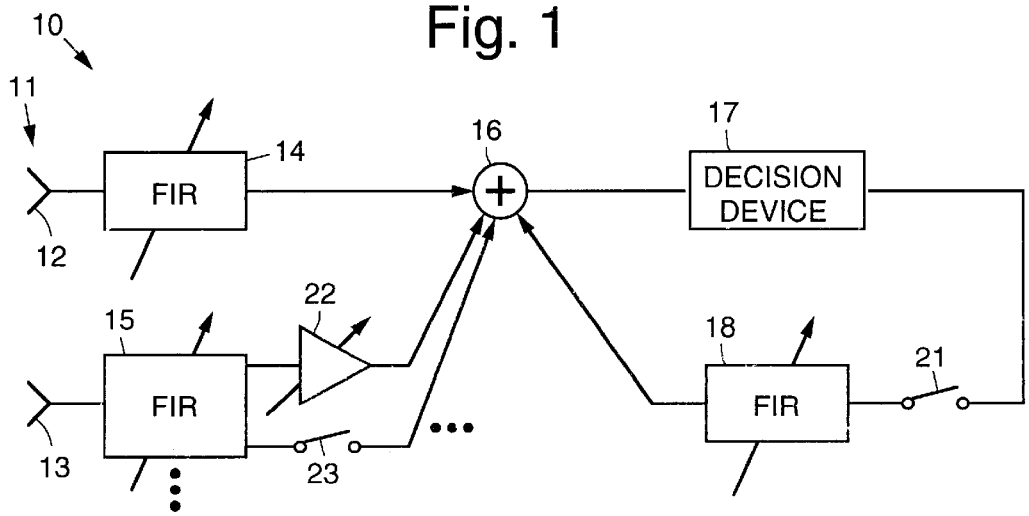
FIG. 1 an exemplary decision-directed decision feedback equalizer in accordance with the principles of the present invention.

Referring to the drawing figures, FIG. 1 an exemplary decision feedback equalizer 10 in accordance with the principles of the present invention. The decision feedback equalizer 10 comprises an antenna array 11 including two or more antenna elements 12, 13 or sensors 12, 13 that comprise input paths. Outputs of the two or more antenna elements 12, 13 or sensors 12, 13 are coupled to a corresponding number of feedforward finite impulse response (FIR) filters 14, 15. Outputs of the feedforward FIR filters 14, 15 are coupled to an adder 16 that combines the respective signals. Outputs of all but one of the feedforward FIR filters 15 are coupled in parallel through an attenuator 22 and a switch 23 to the adder 16.

The output of the adder 16 is coupled to a decision device 17. The output of the decision device 17 is coupled to a decision feedback FIR filter 18 whose output is fed back to the adder 16 and combined with signals derived from the antenna elements 12, 13 and feed forward FIR filters 14, 15. A switch 21 is disposed in the decision feedback path between the decision device 17 and the decision feedback FIR filter 18.

Figure 2:
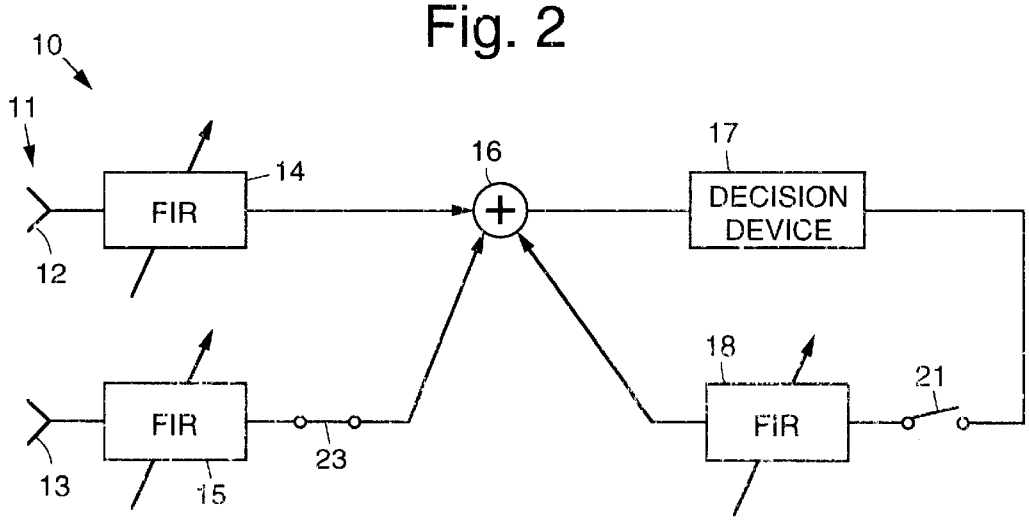
FIG. 2 illustrates the decision feedback equalizer operating in initialization mode.
Figure 3:
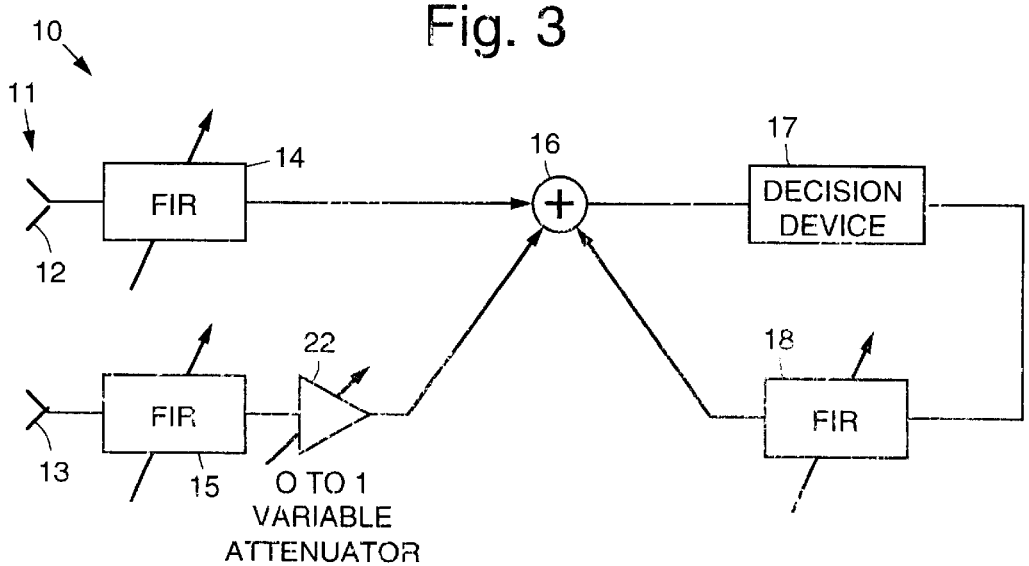
FIG. 3 illustrates the decision feedback equalizer operating in transition mode.
Figure 4:
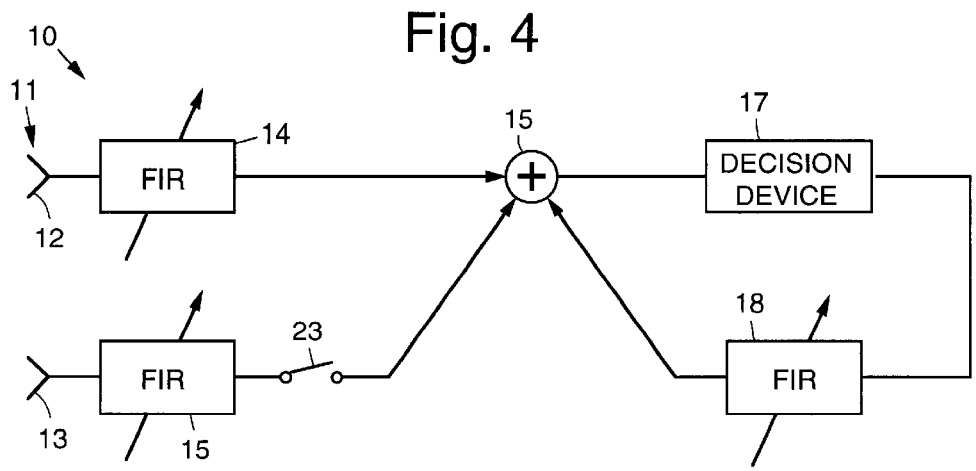
FIG. 4 illustrates the decision feedback equalizer operating in normal mode.

The initialization scheme for the decision feedback equalizer 10 has three modes of operation. FIGS. 2–4 illustrate the modes of operation of the exemplary decision feedback equalizer 10 comprising an antenna array 11 and two antenna elements 12, 13. FIG. 2 illustrates the exemplary decision feedback equalizer 10 operating in initialization mode. FIG. 3 illustrates the decision feedback equalizer 10 operating in transition mode. FIG. 4 illustrates the decision feedback equalizer 10 operating in normal mode.

In initialization mode, the antenna array 11 is adapted using a blind adaptation algorithm such as a constant modulus algorithm (CMA), or prediction error method, for example, while the feedback FIR filter 18 is not used. The Constant Modulus Algorithm uses the following array weight update $$\overline{w}_k(n) = \overline{w}_k(n-1) + \mu \overline{x}_k(n-1) e\,(n-1)$$

in which, $w_k(n)$ is the vector of filter weights for the k-th array element at the n-th time step. $x_k(n)$ is the vector a signal samples in the k-th filter at time step n. $e_k$ is the error at time step n, given by the following formulas:

$$e(n) = y(n) - y(n)\|y(n)\|^2$$
$$y(n) = \sum_k (w_k(n))^H x_k(n).$$

In transition mode, feedback and feedforward FIR filters 14, 15, 18 of the decision feedback equalizer 10 are allowed to adapt as inputs from all but one element of the antenna array 11 are slowly attenuated to zero using the variable attenuators 22. In decision feedback equalizer mode, the decision feedback equalizer 10 operates independently of the other array elements 13, using a single antenna element 12, the decision device 17, decision feedback FIR filter 18, and adder 16. The other array elements 13 may be used for other tasks.

The present invention thus provides for a means to initialize the decision directed adaptation of the decision feedback equalizer 10 in a strong multipath environment. The decision feedback equalizer 10 provides for blind reception of digitally modulated communication signals in a strong multipath environment.

It has been found that a two-element antenna array 11 can be adapted blindly to effectively null multi-path interference received thereby. However, it is to be understood that more than two elements 12, 13 may be used in the array 11. Using the inputs from the array 11, a decision feedback equalizer 10 can he adapted using decision-directed least-mean-square error. The decision feedback equalizer 10 takes over the role of the array 11 as the input from one antenna element 13 is turned off.

One way to interpret this is as follows. Consider a radio that has two receiver paths, each with an associated antenna element 12, 13. The channel contains both multipath distortion as well as noise which is independent of the signal of interest. For strong multipath channels, the feedforward filter 14 with optimal settings cannot equalize the signal sufficiently to provide good statistics for the decision-directed adaptation of the decision feedback equalizer 10. An array, however can equalize such channels. In a two element embodiment of the present invention, the two receive paths are used as an array 11 to null one of the paths. The array 11 is thus adapted blindly. Once the array 11 has sufficiently opened the eye, the decision feedback equalizer 10 is allowed to adapt in decision-directed mode. The radio is transitioned from using two receiver paths as an array 11 to using only one path using a single antenna element 12. The decision feedback equalizer 10 is allowed to adapt while this transition is made. After the transition, only one receiver path is use and the decision feedback equalizer 10 in that path cancels the multi path interference. The other receiver path can be used for other purposes.

Transition dynamics of the decision feedback equalizer 10 will now be discussed. The transition from using the array 11 to using one antenna element 11 or sensor 11 is accomplished as follows. Assume that the array 11 is adapted to obtain an array weighting vector $h_0$. The transition is accompanied using the following parameterized segment.

$$h(\lambda) = (1-\lambda)h_0 + \lambda \begin{pmatrix} 1 \\ 0 \end{pmatrix}$$

Assume $\lambda \in [0, 1]$. As $\lambda \to 1$, the transition takes place.

The step-size of the decision-directed-decision feedback equalizer adaptation must be sufficiently large relative to $d\lambda/dt$ to track the transition. The step-size also must be sufficiently small to satisfy the standard convergence criteria for a decision-directed-decision feedback equalizer.

Figure 5:
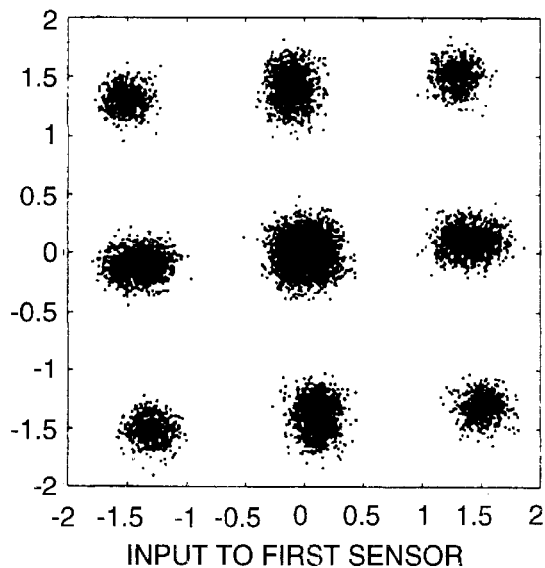
FIGS. 5 and 6 illustrates QPSK multi-path inputs to sensor elements of the decision feedback equalizer.
Figure 6:
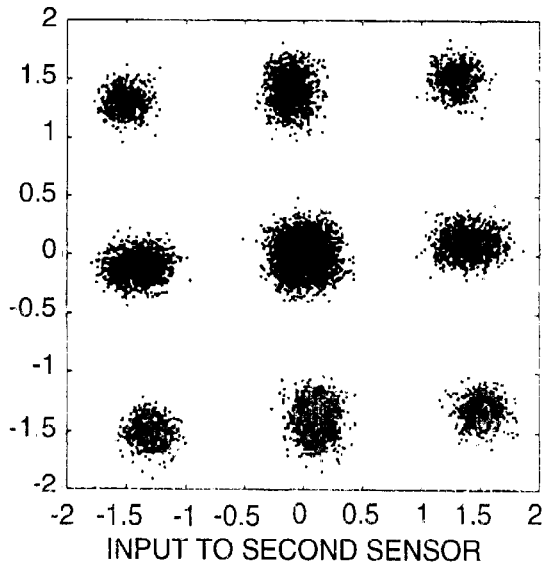

Simulation results for the exemplary decision feedback equalizer 10 will now be discussed. For the simulation results presented, the channel is an equal power multipath using QPSK modulation. The signal-to-noise ratio is 10 dB and the angular separation of the signal paths is $\theta=22.5$ degrees. The outputs of the individual array sensor elements 12, 13 are depicted in FIGS. 5 and 6 for two sensors 12, 13.

Figure 7:
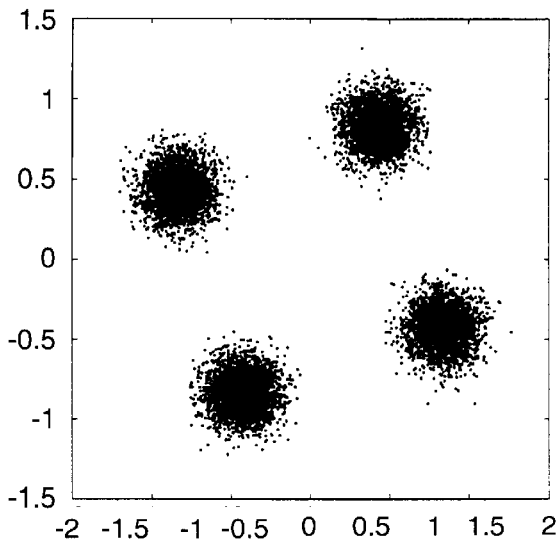
FIG. 7 illustrates the summed output of the array of antenna elements of the decision feedback equalizer.
Figure 8:
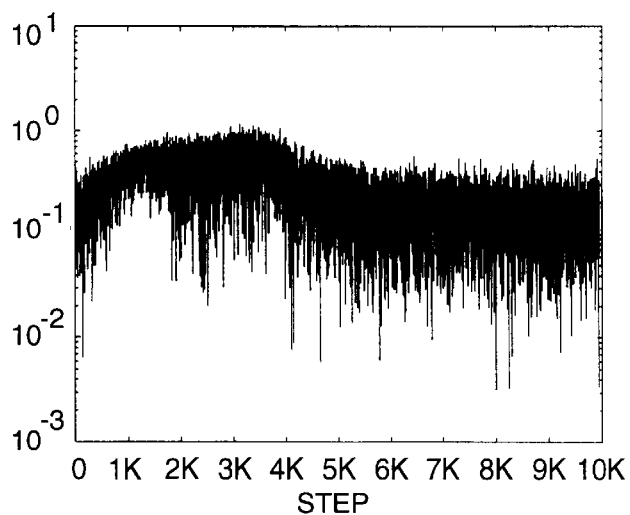
FIG. 8 illustrates a learning curve for the decision-directed decision feedback equalizer during transition.
Figure 9:
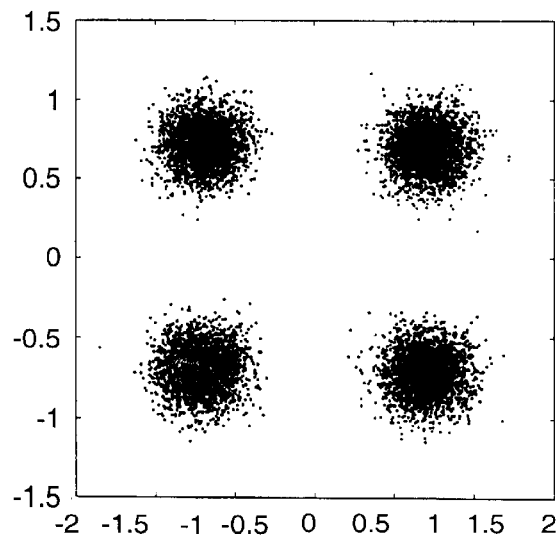
FIG. 9 illustrates the output of the decision feedback equalizer with input derived from only one antenna element.

The output of the array 11, after adaptation, is depicted in FIG. 7. The learning curve of the algorithm implemented by the decision-directed-decision feedback equalizer 10 is displayed in FIG. 8. The initial hump is due to the inability of the decision-directed-decision feedback equalizer 10 to track the transition. The step size is too small relative to $d\lambda/dt$. FIG. 9 shows the output of the decision feedback equalizer 10 after adaptation using the input from only the first sensor 12. It has been demonstrated that the array 11 can be transitioned in such a manner that the decision-directed-decision feedback equalizer 10 can track the changes and eventually cancel the multi-path interference.

Figure 10:
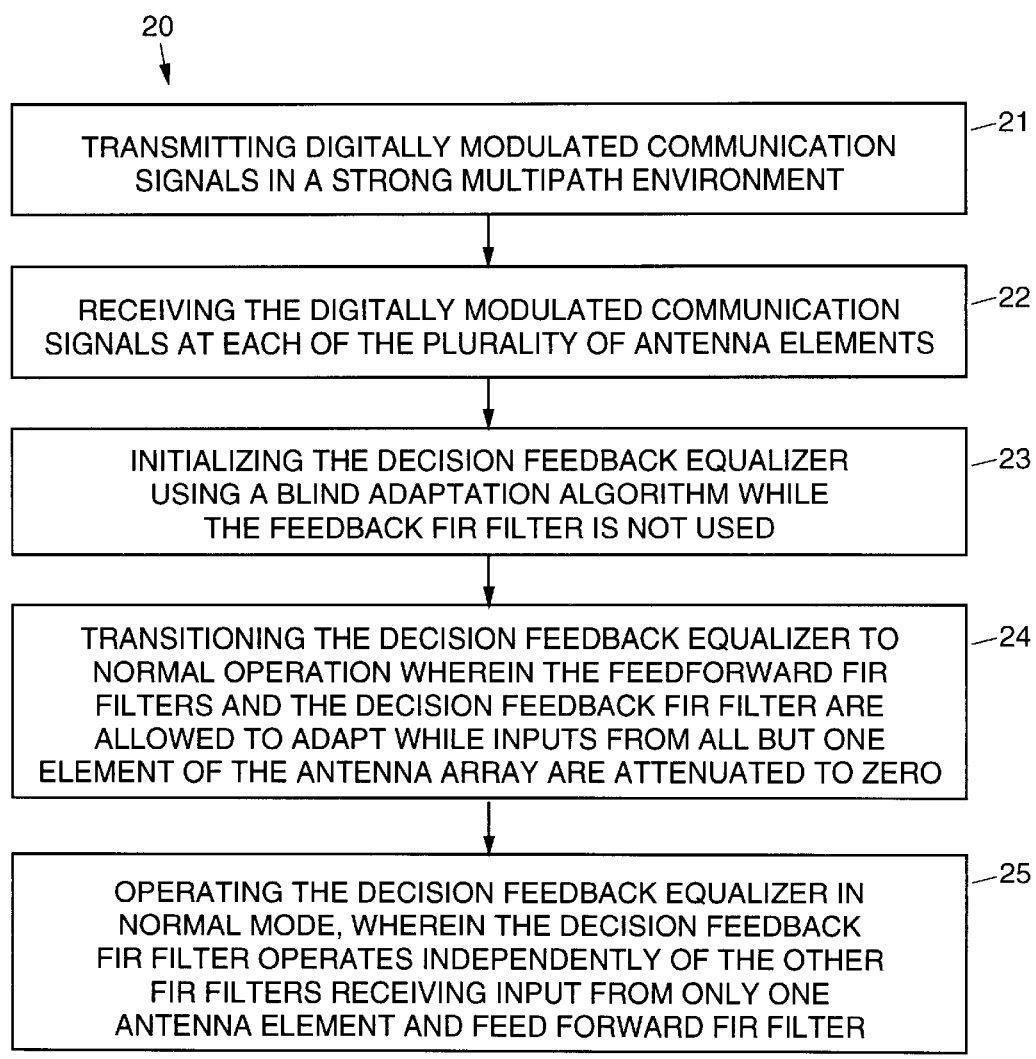
FIG. 10 is a flow chart illustrating an exemplary method in accordance with the principles of the present invention for blindly initializing a decision feedback equalizer.

FIG. 10 is a flow chart illustrating an exemplary method 20 in accordance with the principles of the present invention for blindly initializing a decision feedback equalizer 10. The exemplary method 20 comprises the following steps.

Digitally modulated communication signals are transmitted 21 in a strong multipath environment. The digitally modulated communication signals are received 22 by each of a plurality of antenna elements 12, 13, or sensors 12, 13, that comprise inputs paths of a decision feedback equalizer 10 that comprises a plurality of feedforward finite impulse response (FIR) filters 14, 15, a decision feedback FIR filter 18, an adder 16 for combining signals output by the feedforward and decision feedback FIR filters 14, 15, 18, and a decision device 17 disposed between the adder and the decision feedback FIR filter. The digitally modulated communication signals received by each of the antenna elements 12, 13, or sensors 12, 13, are processed as follows.

The decision feedback equalizer 10 is initialized 23 using a blind adaptation algorithm while the feedback FIR filter 18 is not used. The decision feedback equalizer 10 transitions 24 to normal operation wherein the feedforward FIR filters 14, 15 and the decision feedback FIR filter 18 are allowed to adapt 25 while inputs from all but one element 12 of the antenna array 11 are slowly attenuated to zero, such as by using variable attenuators 22 in the input paths. The decision feedback equalizer 10 then operates 26 in the normal mode, wherein the decision feedback FIR filter 18 operates independently of the other FIR filters 15 receiving input from only one antenna element 12 and feed forward FIR filter 14.

Thus, blind initialization of a decision feedback equalizer using an antenna array has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A decision feedback equalizer comprising:

an antenna array including two or more antenna elements that comprise input paths;

two or more feedforward finite impulse response (FIR) filters respectively coupled to the two or more antenna elements;

an attenuator and a switch coupled in parallel to outputs of all but one of the feedforward FIR filters;

an adder that combines the signals output by the feedforward FIR filters;

a decision device coupled to the output of the adder;

a decision feedback FIR filter coupled to the output of the decision device whose output is fed back to the adder and combined with other signals received thereby; and a switch coupled between the decision device and the decision feedback FIR filter;

and wherein the equalizer is initialized using a blind adaptation algorithm, the equalizer transitions to normal operation by allowing the feedback and feedforward FIR filters to adapt as inputs from all but one antenna element is attenuated to zero, and the equalizer normally operates by using inputs from only one antenna element which is processed by the decision device, the decision feedback FIR filter, and the adder.

2. The equalizer recited in claim 1 wherein the blind adaptation algorithm comprises a constant modulus algorithm.

3. The equalizer recited in claim 1 wherein the blind adaptation algorithm comprises a prediction error method.

4. A method for blindly initializing a decision feedback equalizer that comprises a plurality of antenna elements, a plurality of feedforward finite impulse response (FIR) filters, a decision feedback FIR filter, an adder for combining signals output by the feedforward and decision feedback FIR filters, and a decision device disposed between the adder and the decision feedback FIR filter, the method comprising the steps of:

transmitting digitally modulated communication signals in a strong multipath environment;

receiving the digitally modulated communication signals at each of the plurality of antenna elements;

initializing the decision feedback equalizer using a blind adaptation algorithm while the feedback FIR filter is not used;

transitioning the decision feedback equalizer to normal operation wherein the feedforward FIR filters and the decision feedback FIR filter are allowed to adapt while inputs from all but one element of the antenna array are attenuated to zero; and operating the decision feedback equalizer in normal mode, wherein the decision feedback FIR filter operates independently of the other FIR filters receiving input from only one antenna element and feed forward FIR filter.

5. The method recited in claim 4 wherein the blind adaptation algorithm comprises a constant modulus algorithm.

6. The method recited in claim 4 wherein the blind adaptation algorithm comprises a prediction error method.

* * * * *